United States Patent [19]
Reeder

[11] Patent Number: 5,938,329
[45] Date of Patent: Aug. 17, 1999

[54] GASOLINE ENGINE POWERED BLENDER

[76] Inventor: Marvin M. Reeder, 300 E. Tropicana, #127, Las Vegas, Nev. 89109

[21] Appl. No.: 09/130,111

[22] Filed: Aug. 6, 1998

[51] Int. Cl.⁶ ...................................................... B01F 7/16
[52] U.S. Cl. ............................ 366/206; 366/197; 366/314
[58] Field of Search ..................................... 366/197, 199, 366/205, 206, 314, 601; 241/282.1, 282.2; 99/348

[56] References Cited

U.S. PATENT DOCUMENTS

| | | | |
|---|---|---|---|
| D. 281,945 | 12/1985 | Boyce . | |
| D. 385,149 | 10/1997 | Feil . | |
| 2,822,485 | 2/1958 | Braun et al. | 366/205 |
| 2,841,723 | 7/1958 | Corbett | 366/205 |
| 2,868,025 | 1/1959 | Spear | 366/205 |
| 3,175,594 | 3/1965 | Jepson et al. . | |
| 4,487,509 | 12/1984 | Boyce | 366/199 |
| 4,577,975 | 3/1986 | McCrory et al. | 366/314 |
| 4,887,909 | 12/1989 | Bennett | 366/199 |
| 5,353,697 | 10/1994 | Venturati et al. | 366/205 |
| 5,639,161 | 6/1997 | Sirianni | 366/314 |

*Primary Examiner*—Charles E. Cooley

[57] ABSTRACT

A motorized blender which includes a gasoline powered engine with an integral gas tank attached within a base frame assembly which has numerous steel tubing legs. The gasoline engine is attached utilizing rubber mounting brackets while vibration pads are provided on the ends of the tubing legs. The drive shaft of the gasoline engine mates with a blending drive unit attached to a top portion of the base plate member while a blender vessel is provided which attaches to a top portion of the base plate member. The base frame assembly includes two handle portions extending horizontally and from opposing sides of the base frame assembly and where an on/off operation switch is mounted near one handle and a rotational throttle control is mounted on the other handle so that the handles can be used for gripping the motorized blender when in use and wherein the blender controls are mounted next to and on the handles for easy use and operation of the blender.

3 Claims, 1 Drawing Sheet

GASOLINE ENGINE POWERED BLENDER

TECHNICAL FIELD

The present invention relates to devices and methods for appliances and more particularly to devices and methods for a motorized blender that utilizes a portable gasoline powered blender motor that can be operated anywhere without the need for electricity.

BACKGROUND ART

There are numerous occasions where a blender is necessary and electrical power is not available. The present invention overcomes this problem by providing a blender which includes a portable gasoline engine which powers the blender so that the blender may be operated in any location. The motorized blender also includes a metal frame supporting the gasoline engine which is mounted therein with rubber shock absorbent mounts and having a drive connection suitable for connecting a blender drive unit which is positioned within a blender pitcher vessel. The metal frame also includes vibration absorbing rubber pads placed on the frame support legs and between the blender pitcher and the gasoline powered motor drive. Blender speed is controlled by engine throttle while the blender operation is controlled by an on/off switch.

Numerous patents have been granted regarding blenders, however to date there has never been a blender as the present which overcomes the problems associated with portability of a blender while also having a blender with sufficient power to handle tough blending jobs. The relevant patents are as follows:

Sirianni U.S. Pat. No. 5,639,161 which discloses a pressure switch controlled blender cup apparatus.

Bennett U.S. Pat. No. 4,887,909 which discloses a blender with a thermally insulated container.

Boyce U.S. Pat. No. 4,487,509 which discloses a portable blender.

Jepson et al U.S. Pat. No. 3,175,594 which discloses a disintegrator and mixer.

Feil U.S. Pat. No. 385,149 which discloses an electromotor kitchen appliance.

Boyce U.S. Pat. No. 281,945 which discloses a portable blender.

As can be seen from the prior inventions there has never been an invention as the present which overcomes the problem of portability, blender power and blender speed control as the present invention.

GENERAL SUMMARY DISCUSSION OF INVENTION

It is thus an object of the invention to provide a Motorized Blender that allows a user to operate the blender without the need for electrical power.

It is a further object of the invention to provide a Motorized Blender that allows a user to operate the blender without the need for electrical power and also provide the user with a portable blender which has sufficient power to grind and mix tough blending jobs and also provide a speed controlled by throttle variations of the blender motor.

It is a still further object of the invention to provide a Motorized Blender that includes a gasoline powered engine which is mounted within a metal base frame assembled with four steel tubing legs with rubber mounting tabs for attaching the engine to the base frame assembly further wherein the legs of the base frame assembly have vibration absorbent ends preventing the unit from vibrating on a table top when in operation.

It is a still further object of the invention to provide a Motorized Blender that includes a gasoline powered blender engine with a drive shaft coupling the engine to a blender drive unit which is attached to a top portion of a base frame assembly mounting said gasoline engine.

It is a still further object of the invention to provide a Motorized Blender that includes a gasoline powered engine with a integral gas tank attached to the underside of the engine, a on-off switch and throttle control grip for controlling the speed of the gasoline engine and the operation of the engine.

Accordingly, a Motorized Blender is provided which comprises a metal base frame assembly fabricated of heavy gage metal with steel tubing legs with rubber anti-vibration tabs mounting the gasoline engine to said base frame wherein the gasoline engine includes an integral gas tank and a drive shaft coupling the engine to a blender drive unit which is attached to a top portion of the base frame assembly. Rubber anti-vibration pads are attached to the ends of the tubing legs allowing for a vibration free operation of the blender. The blender drive unit features a neoprene bushing to allowing the drive to spin freely without undue friction, a pair of handle bar type handle grips extend from the base frame assembly on either side of the base frame while one grip has an on/off switch adjacent to it and the opposite grip rotates to control the throttle of the gasoline engine and accordingly the speed of the blender while also allowing the user to securely grip the motorized blender while in use.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
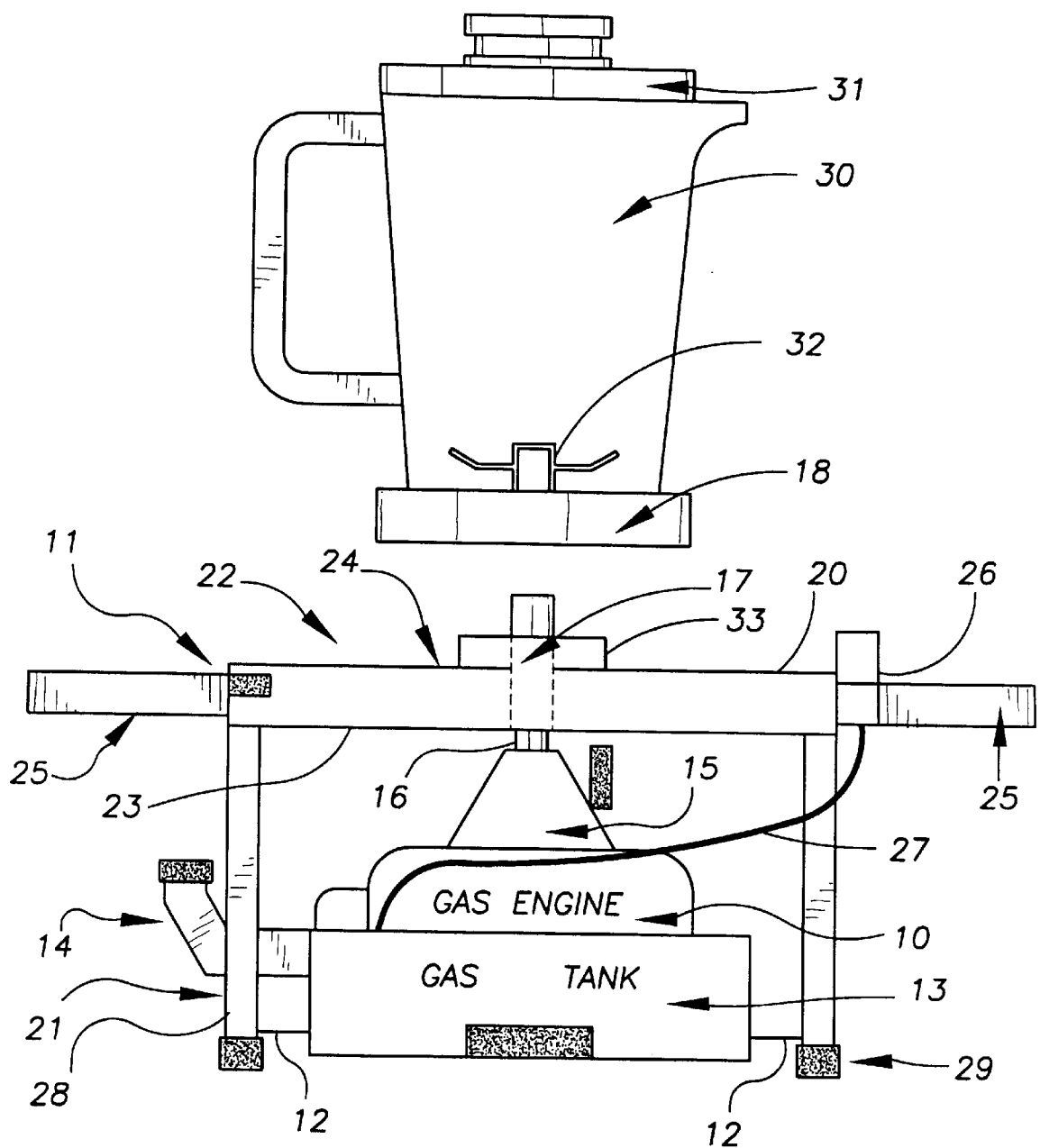
FIG. 1 is a side view of the motorized blender illustrating the placement of gasoline powered engine, the base frame assembly, the drive shaft and the blender pitcher.

It can be seen from the following description that in use a user would simply place items desired to be blended into the blender pitcher vessel, set the vessel on the rubber connector on the blender drive unit, place the on/off switch in the on position, pull the motorized engine pull cord, and then control the blender speed as desired with the throttle grip. When the items in the blender are sufficiently blended the user would then turn the on/off switch to the off position. Use of the motorized blender provides a convenient method for allowing a user to blend items at a barbecue, tail-gate party, camp site, on a boat or any other outdoor location without the need for electricity.

Referring to the drawing in the detail, FIG. 1 illustrates the component parts of the motorized blender. The blender comprises a gasoline powered engine 10 mounted within a metal base frame assembly 20. The metal base frame assembly 20 includes a number of vertically positioned tubular legs 21 and a base portion 22 which has a bottom surface 23 from which the vertical tubular leg members 21 extend. The base frame 22 also has a top surface 24 which is the surface for receiving the blender pitcher vessel 30. The base frame assembly 20 further includes two projecting handles 25 which preferably extend horizontally from the base portion 22 on opposing sides. The handles 25 provide a gripping location for the user to grasp and hold the motorized blender while in use. Furthermore, operational features of the blender motor are located near the gripping handle 25 to allow a user to have full control of the motorized blender while gripping the unit. An on/off switch 11 is provided near the gripping handle 25. The on/off switch is electrically connected to the gasoline engine 10 and is preferably a rocker or slide switch positioned near the handle 25 so that the user may flip the switch easily with his or her thumb. The other gripping handle 25 has a rotating handle type throttle control 26 which is provided for controlling the speed of the gasoline engine 10. A throttle cable 27 extends from the rotating throttle control to the engine 10. Providing the throttle control on one grip 25 and the on/off switch 11 near the other grip 25 provides an effective design for fully controlling the unit.

The base frame assembly is preferably constructed of heavy gage metal coated with a rust inhibiting paint or galvanization. The vertical legs 21 are preferably tubular in shape and are likewise coated with anti-corrosive materials. The ends of the vertical legs 28 include rubber pads 29 which allow the unit to operate on a table top without undue vibration.

The gasoline powered motor 10 is mounted within the base frame assembly utilizing rubber mounting brackets 12. The rubber mounting brackets 12 prevent undue vibration while the unit is in operation. The gasoline powered engine 10 also includes an integral gas tank 13 located below the engine with an easy to reach gasoline fill spout 14. The gasoline engine driver shaft end 16 is positioned vertically within the base frame assembly 20 and extends from a drive shaft protecting member 15 of the gasoline powered engine 10. Additionally, the drive shaft 16 is coupled to a blender drive unit 17 which is centrally located within the base member 22 of the base frame assembly 20. The blender drive unit 17 extends through a blender pitcher vessel mount 33 which provides a location for placing the blender pitcher vessel 30 and at the same time coupling the gasoline engine 10 drive shaft 16 to the blender vessel base portion 18. The blender vessel 30 also includes a cap 31 and mixing impellers 32. The impellers rotate as a result of the coupled drive frame from the gasoline engine to the blender vessel.

It is noted that the embodiment of the Motorized Blender described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Motorized Blender comprising:

a) a gasoline engine mounted within a metal base frame wherein the base frame includes a number of vertically positioned legs with rubber ends to reduce vibration of the blender while in operation, the metal base frame includes a base portion which is a planar member attached to a top end of the legs while the gasoline engine is mounted within the metal base frame under the base portion by a number of rubber mounting members which help reduce vibration of the blender while in use, the gasoline engine is mounted with a vertically placed shaft, b) a pair of horizontally positioned handles are mounted to the base portion and extend from the base portion on opposing sides which provide a grasping means for handling the blender while in use, c) an on/off switch for controlling operation of the gasoline engine and wherein the on/off switch is located adjacent to one of the horizontally positioned handles, d) a rotating throttle control for controlling the speed of the gasoline engine and the blender speed wherein the rotating throttle control is mounted on one of the horizontally positioned handles, e) the shaft of the gasoline engine being coupled to a blender drive coupling which extends through a central aperture in the base portion and wherein the blender drive coupling is mounted on a top surface of the base portion, further wherein a blender pitcher vessel mount is provided on the top surface for securely placing a blender pitcher vessel on the blender, and f) the blender pitcher vessel having a drive coupler adapted to engage the blender drive coupling, the drive coupler of the blender pitcher vessel being engaged with impellers mounted therein which contact contents of the vessel to perform a blending action, and a mount receiving portion for mounting the blender pitcher vessel on the blender.

2. The Motorized Blender of claim 1, wherein the gasoline engine further comprises a gas tank integrally positioned under the engine and further with a gasoline filling spout extending from the gas tank for easy filling of the tank.

3. The Motorized Blender of claim 1, wherein the vertically positioned legs further comprise four vertically positioned legs extending from a bottom surface of the base portion.

* * * * *